United States Patent
Mercier et al.

(10) Patent No.: US 11,381,971 B2
(45) Date of Patent: Jul. 5, 2022

(54) BLUETOOTH LOW ENERGY AUTHORIZATION OF CLOUD-MANAGED DEVICES

(71) Applicant: HEWLETT PACKARD ENTERPRISE DEVELOPMENT LP, Houston, TX (US)

(72) Inventors: Mathieu Mercier, Laval (CA); Robert Gagnon, St. Laurent (CA); Guy Letourneau, Boucherville (CA); Stephane Laroche, St. Laurent (CA); Ho-Kuo Chan, St. Laurent (CA)

(73) Assignee: Hewlett Packard Enterprise Development LP, Houston, TX (US)

(*) Notice: Subject to any disclaimer, the term of this patent is extended or adjusted under 35 U.S.C. 154(b) by 493 days.

(21) Appl. No.: 16/264,487

(22) Filed: Jan. 31, 2019

(65) Prior Publication Data
US 2020/0252799 A1 Aug. 6, 2020

(51) Int. Cl.
*H04W 12/08* (2021.01)
*H04W 48/16* (2009.01)
(Continued)

(52) U.S. Cl.
CPC ........... *H04W 12/08* (2013.01); *H04W 48/16* (2013.01); *H04L 67/10* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 8,189,608 B2* | 5/2012 | Duo | H04W 48/10 370/401 |
| 8,401,550 B1* | 3/2013 | Miller | H04W 12/06 455/435.1 |

(Continued)

OTHER PUBLICATIONS

UniFi; "Enterprise System Controller R 5.6.2"; 2018; Retrieved from the Internet https://dl.ui.com/guides/UniFi/UniFi_Controller_V5_UG.pdf; pp. 1-178, as printed. (Year: 2018).*

(Continued)

*Primary Examiner* — Michael W Chao
(74) *Attorney, Agent, or Firm* — McDermott Will & Emery (57) ABSTRACT

A method of authorizing an access point includes receiving a first transmission signal from a first access point. The first transmission signal comprises identifying information of the first access point that includes a first token. The method includes receiving a second transmission signal from a client device. The second transmission signal includes a second token that is received by the client device from an un-provisioned access point. When a match is determined between the first token and the second token, the first access point is identified as the un-provisioned access point. The method includes transmitting the identifying information of the first access point and a request to the client device to authorize the un-provisioned access point. The method includes receiving a third transmission signal from the client device that includes an authorization verification of the un-provisioned access point that authorities the un-provisioned access point to connect to a cloud-managed network.

17 Claims, 5 Drawing Sheets

(51) Int. Cl.
*H04W 4/80* (2018.01)
*H04L 67/10* (2022.01)

(56) References Cited

U.S. PATENT DOCUMENTS

| | | | |
|---|---|---|---|
| 8,917,651 | B2 | 12/2014 | Dattagupta |
| 9,258,713 | B2 | 2/2016 | Rangarajan et al. |
| 9,258,765 | B1* | 2/2016 | daCosta ................ H04L 41/12 |
| 9,386,445 | B2 | 7/2016 | Koo et al. |
| 9,854,653 | B1* | 12/2017 | Ackmann ............. H05B 47/11 |
| 10,638,417 | B1* | 4/2020 | Baki .................... H04W 24/02 |
| 11,165,641 | B2* | 11/2021 | Papa ................... H04W 84/105 |
| 11,172,520 | B2* | 11/2021 | Xu ....................... H04W 12/06 |
| 11,184,768 | B2* | 11/2021 | Kotay .................. H04W 48/18 |
| 11,265,708 | B2* | 3/2022 | Chen .................... H04W 12/06 |
| 2014/0286321 | A1 | 9/2014 | Balian et al. |
| 2016/0088424 | A1* | 3/2016 | Polo ....................... H04W 4/80 455/41.1 |
| 2016/0095064 | A1* | 3/2016 | Li .......................... H04W 4/06 370/311 |
| 2016/0134605 | A1* | 5/2016 | Cregg .................. H04L 12/283 380/278 |
| 2016/0270020 | A1* | 9/2016 | Adrangi .............. G06F 16/9554 |
| 2016/0323863 | A1* | 11/2016 | Park ....................... H04W 4/80 |
| 2017/0126678 | A1* | 5/2017 | Kang ................. H04L 63/0876 |
| 2017/0295491 | A1* | 10/2017 | Gehrmann ........ H04W 12/0431 |
| 2017/0318529 | A1* | 11/2017 | Wiser ................ H04W 52/0209 |
| 2017/0339561 | A1* | 11/2017 | Wennemyr ........... H04W 12/02 |
| 2018/0063714 | A1* | 3/2018 | Stephenson ........... H04W 12/35 |
| 2018/0132092 | A1* | 5/2018 | Choi ....................... H04W 4/80 |
| 2018/0176776 | A1* | 6/2018 | Knaappila ............. H04W 12/06 |
| 2018/0191565 | A1* | 7/2018 | Cooppan ............ H04L 41/0809 |
| 2018/0199246 | A1* | 7/2018 | Cheung ................. H04L 67/34 |
| 2018/0331828 | A1* | 11/2018 | Pakkan ................. H04W 12/35 |
| 2019/0038932 | A1* | 2/2019 | Eckblad ............. G09B 19/0038 |
| 2019/0104411 | A1* | 4/2019 | Hotchkiss ............. H04W 12/08 |
| 2021/0076216 | A1* | 3/2021 | Hotchkiss ........... H04W 12/082 |

OTHER PUBLICATIONS

Eronen et al.; "Diameter Extensible Authentication Protocol (EAP) Application"; 2005; Retrieved from the Internet https://www.rfc-editor.org/rfc/pdfrfc/rfc4072.txt.pdf; pp. 1-33, as printed. (Year: 2005).*

Seetarama; "Secure Device Bootstrapping with the Nimble Out of Band Authentication Protocol"; 2017; Retrieved from the Internet https://aaltodoc.aalto.fi/bitstream/handle/123456789/26703/master_Mudugodu_Seetarama_Raghavendra_2017.pdf; pp. 1-71, as printed. (Year: 2017).*

Bluetooth Low Energy (BLE), (Web Page), Retrieved Oct. 19, 2018, 5 Pgs., https//documentation.meraki.com/MR/Bluetooth/Bluetooth_Low_Energy_(BLE).

Connecting devices, (Web page), Retrieved Oct. 19, 2018, 7 Pgs., https//console.bluemix.net/docs/services/IoT/iotplatform_task.html#iotplatform_task.

* cited by examiner

BLUETOOTH LOW ENERGY AUTHORIZATION OF CLOUD-MANAGED DEVICES

BACKGROUND

A conventional cloud-managed network may include one or more network devices, one or more network controllers, and one or more access points. Each network controller of the cloud-managed network is coupled between the network devices and one or more access points such that the access points may connect and communicate to the network devices through the network controllers. Additionally, the access points are cloud-managed via the network controller. Each access point is coupled to one or more client devices such that the client devices may connect and communicate to the cloud-managed network through the access points and via the network controllers.

The cloud-managed network may have a number of customer accounts and thus the access points may be associated with a specific customer account. As a result, the client devices may connect to the access point that are associated with the specific customer account. When a new access point is turned on, the new access point may need to be verified before connecting to the cloud-managed network and before being associated with the specific customer account in the cloud-managed network.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

In some embodiments, an exemplary authorization system for authorizing an access point is discussed. In some examples, a cloud-managed network exists and the cloud-managed network includes a customer account. The cloud-managed network may include a device management system associated with the cloud-managed network. The device management system may be used as an interface for connecting and communicating with the cloud-managed network. The cloud-managed network may also include one or more access points, e.g., cloud-managed access points, that are associated with the customer account. The access points may be authenticated and authorized by the device management system and thus may connect and communicate with the cloud-managed network through the device management system. The access points may also become associated with the customer account of the cloud-managed network. The access points may communicate to the device management system via a primary port, e.g., a gateway, of the device management system.

In some examples, a client, e.g., an administrator of the customer account, may introduce a new access point to be connected to the cloud-managed network and become associated with the customer account on the cloud-managed network. The administrator may introduce the new access point through the device management system. Before being able to connect to the cloud-managed network, the new access point needs to be authorized. Thus, the new access point is an un-provisioned access point until the new access point is authorized to become associated with the customer account. The authorization may happen when the un-provisioned access point communicates with the primary port of the device management system and provides the required security credentials through the primary port to the device management system of the cloud-managed network.

In some embodiments, when a first un-provisioned access point turns on for the first time, it may not have authorization to connect to the cloud-managed network and to become associated with the customer account of the cloud-managed network. In some embodiments, the first un-provisioned access point is manufactured by a manufacturer know to the device management system and includes the required security credentials. However, the first un-provisioned access point still needs authorization to be associated with a specific customer account. In some embodiments, when the first un-provisioned access point communicates with the device management system through the primary port to be connect to the cloud-managed network, the device management system directs the first un-provisioned access point to communicate through a secondary port of the device management system. In some examples, the un-provisioned access point does not communicate with the primary port and initiates communication with the secondary port. The first un-provisioned access point may send identifying information of the first un-provisioned access point including a first token, e.g., a unique token, of the first un-provisioned access point to the device management system via the secondary port of the device management system. In some embodiments, shortly after receiving the identifying information and the first token of the first un-provisioned access point, the device management system receives a transmission including a second token associated with the un-provisioned access point. The transmission that includes the second token may be received from a client device, e.g., a smart phone, associated with the administrator of the customer account of the cloud-managed network. The device management system may compare the first token, received from the first un-provisioned access point via the secondary port, to the second token. If the two tokens match, the device management system may send, e.g., transmit, a signal to the client device associated with the administrator of the customer account. The signal may include the identifying information of the first un-provisioned access point and may request the client device to authorize the first un-provisioned access point. In response, the device management system may receive another transmission from the client device associated with the administrator of the customer account. The other transmission from the client device associated with the administrator of the customer account may include an authorization verification and an instruction to allow the first un-provisioned access point to connect, e.g., to link, to the cloud-managed network. The instruction may also allow the first un-provisioned access point to become associated with the customer account of the cloud-managed network.

In some embodiments, the client device associated with the administrator of the customer account may directly connect to a management port, e.g., customer management port, of the device management system to communicate and to send the second token. In some embodiments, the customer account is associated with one or more access points. A new access point may be introduced by the administrator of the customer account to connect to the cloud-managed network and to become associated with the customer account. In some examples, other devices such as household or kitchen items may be authorized by the administrator to become connected to the customer account of the cloud-managed network.

According to various aspects of the subject technology, a method of authorizing an access point is described. The method includes receiving a first transmission signal from a first access point. The first transmission signal comprises identifying information of the first access point that comprises a first token. The method also includes receiving a second transmission signal from a client device. The second transmission signal comprises a second token that is received by the client device from an un-provisioned access point. In response to determining a match between the first token and the second token, the first access point is identified as the un-provisioned access point. The method further includes transmitting the identifying information of the first access point and a request to the client device to authorize the un-provisioned access point. The method includes receiving a third transmission signal from the client device. The third transmission signal comprises an authorization verification of the un-provisioned access point that authorities the un-provisioned access point to connect to a cloud-managed network and become associated with a customer account of the cloud-managed network.

According to various aspects of the subject technology, a method of authorizing an access point is described. The method includes receiving one or more first transmission signals from a first group of one or more first access points. Each one of the one or more first transmission signal includes identifying information of a respective first access point that comprises a respective first token. The method also includes receiving a second transmission signal from a client device. The second transmission signal comprises one or more second tokens received by the client device from a second group of one or more un-provisioned access points. In response to determining one or more matches between the respective first tokens of the first group of one or more first access points and the one or more second tokens, respective first access points corresponding to the one or more matches are identified as respective un-provisioned access points. The method further includes transmitting the identifying information of the respective first access points and a request to the client device to authorize the respective un-provisioned access points. The method includes receiving a third transmission signal from the client device. The third transmission signal comprises an authorization verification of at least one of the respective un-provisioned access points that authorities the at least one of the respective un-provisioned access points to connect to a cloud-managed network and become associated with a customer account of the cloud-managed network.

According to various aspects of the subject technology, a non-transitory machine-readable storage medium encoded with instructions executable by at least one processor of a device management system of a cloud-managed network, the machine-readable storage medium includes instructions to receive a first transmission signal from a first access point. The first transmission signal includes identifying information of the first access point that comprises a first token. The machine-readable storage medium also includes instructions to receive a second transmission signal from a client device. The second transmission signal includes a second token that is received by the client device from a un-provisioned access point. The machine-readable storage medium also includes instructions that in response to determining a match between the first token and the second token, identifies the first access point as the un-provisioned access point. The machine-readable storage medium includes instructions to receive a third transmission signal from the client device. The third transmission signal includes an authorization verification of the un-provisioned access point. The machine-readable storage medium also includes instructions that in response to receiving the authorization verification, provides security credentials for the un-provisioned access point to connect to the cloud-managed network and become associated with a customer account of the cloud-managed network. The machine-readable storage medium further includes instructions that in response to receiving a connection request from the un-provisioned access point, connects the un-provisioned access point to the cloud-managed network using the security credentials.

Figure 1:
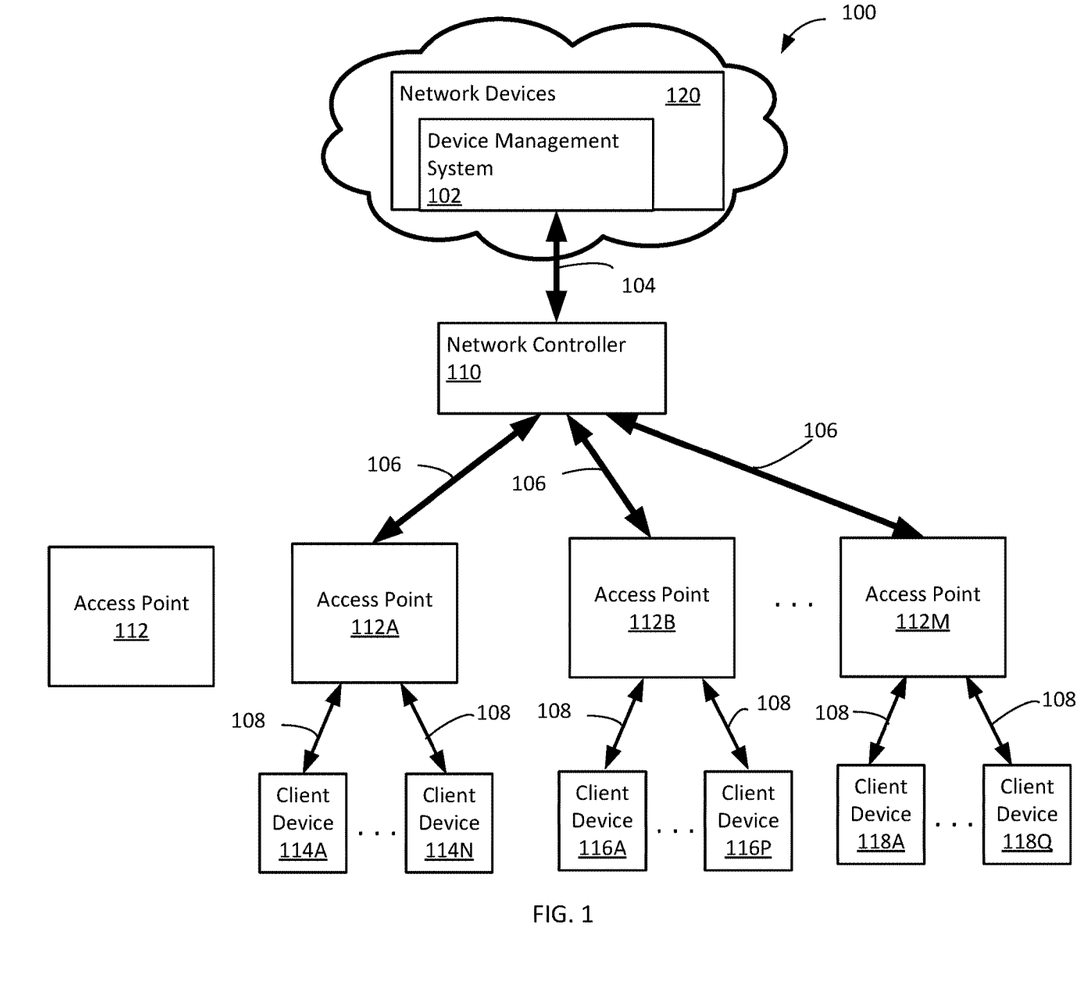
FIG. 1 illustrates a schematic diagram of an exemplary cloud-managed network, according to some aspects of the disclosure.

FIG. 1 illustrates a schematic diagram of an exemplary cloud-managed network 100, according to some aspects of the disclosure. Cloud-managed network 100 includes cloud network device 120 that includes device management system 102. Cloud-managed network 100 further includes network controller 110 and access points 112A, 112B, to 112M. The access points 112A, 112B, to 112M, are connected to device management system 102 via communication links 106, network controller 110, and communication link 104. Communication links 106 and 104 may include one or more communication channels. The access points 112A, 112B, to 112M, may communicate with device management system 102 and may send and receive signals that include data, commands, and requests. In some examples, the access points 112A, 112B, and 112M are authenticated and authorized before being able to communicate with network controller 110 and/or device management system 102. In some embodiments, each access point 112A, 112B, to 112M, may communicate with one or more client devices. In some examples, access point 112A communicates with client devices 114A to 114N, access point 112B communicates with client devices 116A to 116P, and access point 112M communicates with client devices 118A to 118Q. In some embodiments, client devices 114A to 114N, 116A to 116P, and 118A to 118Q are connected to the respective access point 112A, 112B, to 112M via communication links 108, which may include one or more communication channels. In some examples, access points 112A, 112B, to 112M, are authorized to connect and communicate with cloud-managed network 100. In some examples, access points 112A, 112B, to 112M, are authorized to become associated with a customer account in cloud-managed network 100. In some examples, client devices 114A to 114N, 116A to 116P, and 118A to 118Q are authenticated to connect and communicate with the cloud-managed network via respective access points 112A, 112B, to 112M.

As shown in FIG. 1, a new access point, e.g., access point 112, may be introduced to be connected to cloud-managed network 100. In some examples, access point 112 is introduced by an administrator of the customer account. Access point 112 may need to be authorized to be able to connect to cloud-managed network 100 and may need to be authorized to become associated with a customer account of the cloud-managed network 100. In some examples, if access point 112, for the first time, uses one or more channels of communication links, e.g., communication links 106 and 104, to connect to cloud-managed network 100, the connection may be rejected by device management system 102. In some examples, communication links 106 and 104 are wireless and/or wired communication links.

In some embodiments, a process of connecting access point 112, e.g., a cloud-managed access point, to cloud-managed network 100 may be facilitated. The process may use a client device, e.g., a mobile phone, of an administrator of the customer account to authorize access point 112. The process of connecting access point 112 to cloud-managed network 100 is described with respect to FIG. 7.

Figure 2:
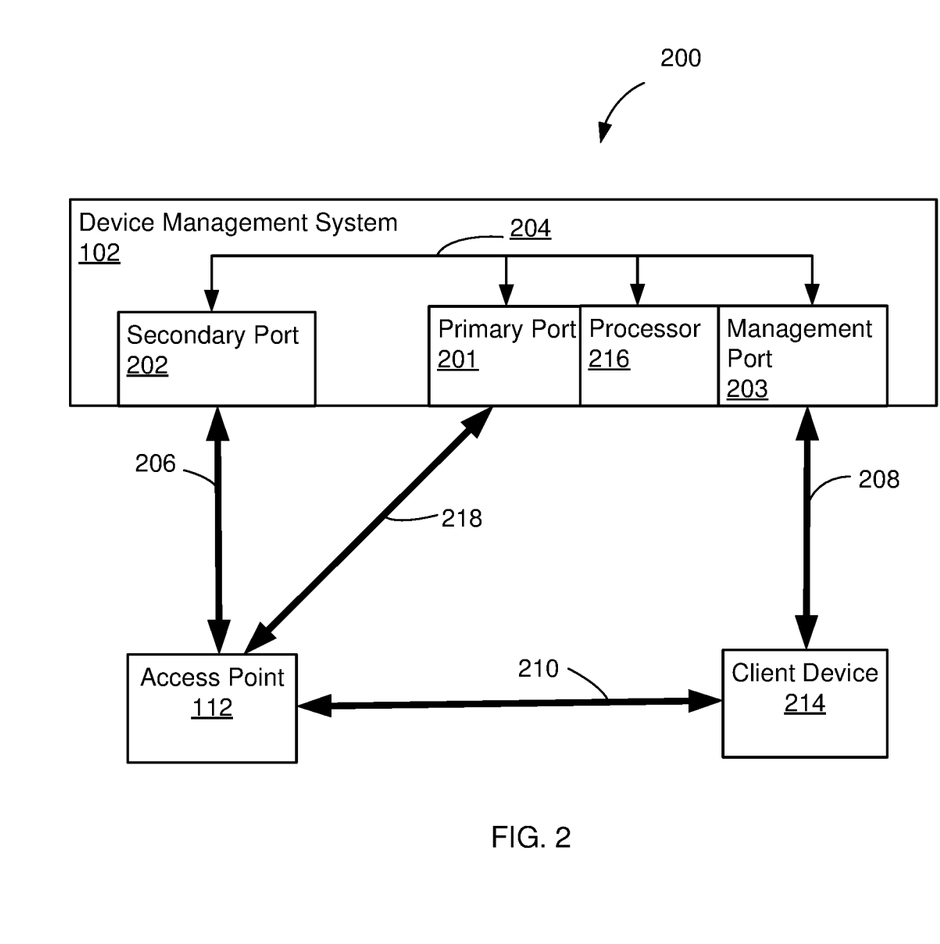
FIG. 2 illustrates a schematic diagram of an exemplary authorization system, according to some aspects of the disclosure.

FIG. 2 illustrates a schematic diagram of an exemplary authorization system 200, according to some aspects of the disclosure. Authorization system 200 includes device management system 102 of FIG. 1, which includes primary port 201, secondary port 202, and management port 203, e.g., customer management port. In some embodiments, device management system 102 further includes processor 216 that controls primary port 201, secondary port 202, and management port 203. Processor 216 may communicate to primary port 201, secondary port 202, and management port 203 through communication link 204. Authorization system 200 also includes communication links 206 and 218 that access point 112 may use for communicating to secondary port 202 and primary port 201 respectively. Although not shown in FIG. 2, communication links 206 and 218 may pass through network controller 110 (shown in FIG. 1). In some examples, access point 112 is an un-provisioned access point that is not yet connected to cloud-managed network 100. Initially, access point 112 may communicate via one or more channels of communication link 218 to primary port 201 of device management system 102 to get connected to cloud-managed network 100 and become associated with the customer account of cloud-managed network 100. Customer accounts of cloud-managed network 100 may be stored on cloud network device 120 of FIG. 1. device management system 102 may deny the connection and may instruct access point 112, via communication link 218, to communicate through secondary port 202 of device management system 102. Then access point 112 may communicate with secondary port 202 of device management system 102 via one or more channels of communication link 206. The communication between access point 112 and secondary port 202 of device management system 102 is described with respect to FIG. 3. The communication between access point 112 and client device 214, via one or more channels of communication link 210, is described with respect to FIG. 4. The communication between client device 214 and management port 203 of device management system 102, via one or more channels of communication link 208, is described with respect to FIG. 6. In some examples, primary port 201, secondary port 202, and management port 203 communicate through communication link 204, which is a communication bus of device management system 102. In some embodiments, client device 214 is a client device of an administrator of a customer account and thus may directly connect and communicate with device management system 102 through management port 203 and may not need to connect via an access point. In some examples, primary port 201 and secondary port 202 are the same port the communications described below with respect to the primary port 201 and secondary port 202 are performed with a single port of device management system 102.

Figure 3:
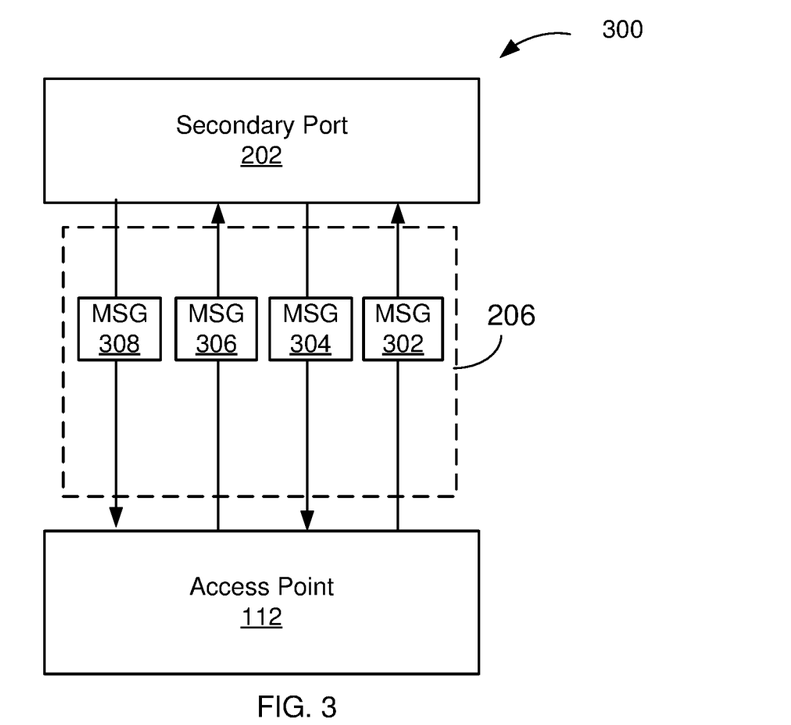
FIG. 3 illustrates a schematic diagram of an exemplary authorization system, according to some aspects of the disclosure.

FIG. 3 illustrates a schematic diagram of an exemplary authorization system 300, according to some aspects of the disclosure. Authorization system 300 is a portion of authorization system 200 that shows access point 112, which is coupled through communication link 206 to secondary port 202 of device management system 102. As noted, access point 112 is an un-provisioned access point, which is not yet connected to cloud-managed network 100. In some embodiments, a processor of access point 112 (not shown) and a processor of device management system 102, e.g., processor 216, control and synchronize communication links 218 and 206. As shown in FIG. 1, access points, e.g., access point 112, may communicate via network controller 110 with device management system 102. Thus, each one of the communication links 218 and 206 may comprise communication links 106 and 104 of FIG. 1 that pass through network controller 110.

In some embodiments, access point 112 sends a transmission signal that includes message 302 to secondary port 202 of device management system 102 to request authorization from device management system 102. Message 302 may be sent via communication link 206 and may include a request for connection to cloud-managed network 100. Message 302 may also include identifying information of access point 112. In response to receiving message 302, secondary port 202 may transmit message 304 to access point 112. Message 304 may be sent via communication link 206 and may also include an instruction from device management system 102 to retry connection, e.g., reconnect, after a predefined time interval, e.g., after 1 second to 10 seconds.

In some embodiments, the access points, e.g., access point 112, includes a short range transmitter that may transmit short range wireless beacons. The short range wireless beacon may transmit one or more information of access point 112 to introduce access point 112 to the environment around access point 112. The information transmitted by the short range beacon of access point 112 may indicate support for scan requests. Thus, the information may indicate that access point 112 may respond to a scan request and may transmit a scan response with the information requested in the scan request. In some examples, the short range wireless beacon is Bluetooth low energy (BLE) beacon. As discussed, message 302 may include identifying information of access point 112 and it is transmitted via communication link 206 to secondary port 202. The identifying information of access point 112 may include a serial number of access point 112, a model of access point 112, and a base MAC address of access point 112. In some examples, device management system 102 may check the identifying information of access point 112 before sending message 304. In some embodiments, identifying information of access point 112 includes a media access control (MAC) address of the short range transmitter of access point 112. In some examples, the MAC address of the short range transmitter of access point 112 is a BLE MAC address. In some embodiments, before receiving the transmission that includes message 302, device management system 102 may receive a message in a primary, e.g., initial, transmission signal from access point 112. The message in the primary transmission signal may include the identifying information but may not include a token. Then device management system 102 may generate and provide a token, e.g., an information-opaque token such as a secret token, included in a reply message, via secondary port 202 to access points 112. The token may be generated by device management system 102 and may be stored in device management system 102. In some examples, the token may not be included by access point 112 in the identifying information of message 302 when requesting authorization from device management system 102 and the device management system may retrieve the stored token (unique token) based on the rest of the identifying information.

In some embodiments, after the predefined time interval has passed, access point 112 sends message 306 to secondary port 202 of device management system 102 to request connection and authorization. Message 306 may be sent via communication link 206 and may include the identifying information of access point 112. In some examples, message 302 and 306 are the same. In response to receiving message 306, secondary port 202 may send message 308 to access point 112. Message 308 may be sent via communication link 206 and may include an instruction from device management system 102 to access point 112 to try connection through primary port 201. In some examples, secondary port 202 is an onboarding port that facilitates an initial connection of an access point with cloud-managed network 100. In some examples, even after the predefined time interval, when access point 112 sends message 306, secondary port 202 may reply with message 304, instructing access point 112 to retry connection again after another predefined time interval. Retrying for connection may continue until message 308 is received by access point 112. In some examples, a dynamic token is used such that the token gets updated each time device management system 102 sends message 304. Thus, each time a message 304 is sent in reply to message 302, a new token is used by device management system 102 and access point 112 may use the new token until it is updated again.

Figure 4:
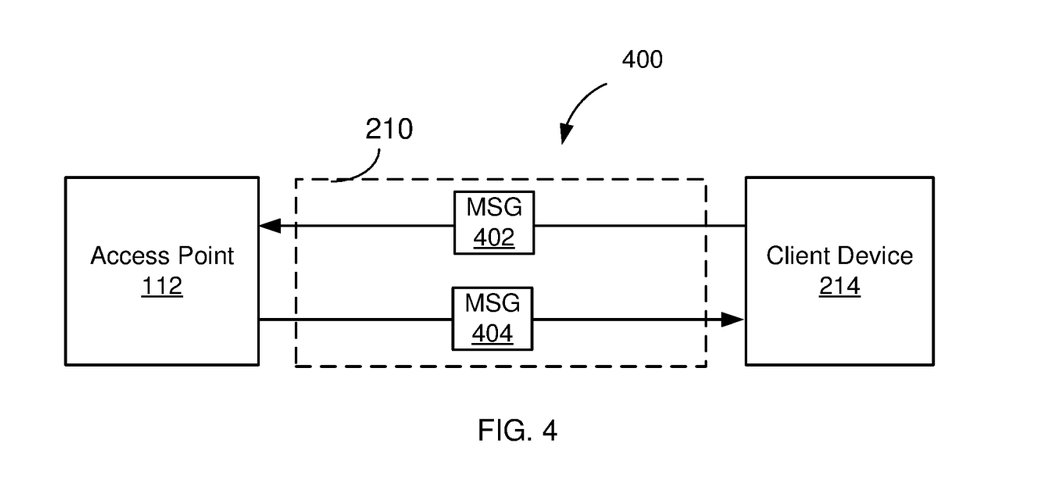
FIG. 4 illustrates a schematic diagram of an exemplary authorization system, according to some aspects of the disclosure.

FIG. 4 illustrates a schematic diagram of an exemplary authorization system 400, according to some aspects of the disclosure. Authorization system 400 is a portion of authorization system 200 that shows access point 112, which is coupled through communication link 210 to client device 214. In some embodiments, a processor of access point 112 (not shown) and a processor of client device 214 (not shown) control and synchronize communication link 210. In some embodiments, both access point 112 and client device 214 have transmitters and receivers for transmitting and receiving short range transmission signals, e.g., BLE signals. In some examples, client device 214 receives a short range transmission beacon, e.g., a BLE beacon, from access point 112. A payload of the short range transmission beacon may indicate that access point 112 supports scan requests. Client device 214 may use the identifying information, e.g., a token of access point 112, to identify, e.g., distinguish, access point 112. In response, a payload of the scan response from access point 112 may include the identifying information. The scan requests may be sent to access points that have indicated in the beacon the support for scan request and have provided valid vendor identification in the beacon.

In some embodiments, client device 214 sends scan request message 402, via communication link 210 and using a short range transmission signal to access point 112. Scan request message 402 may be initiated by the administrator of the customer account to connect access point 112 to cloud-managed network 100 and associate access point 112 with the customer account. The scan request may include a request for response from access point 112. In response to receiving scan request message 402, access point 112 may send scan response message 404, via communication link 210, which is a short range communication link, to client device 214. Scan response message 404 may include the token of access point 112. In some examples, scan response may include one of the MAC addresses of the short range transmitter, the BLE MAC address, or the token provided by device management system 102. In some embodiments, one or more access points including access point 112 receive the scan request message 402. Thus, client device 214 may receive a scan response messages 404 from one or more access points including access point 112. Client device 214 may extract a token from each scan response. The scan response may include one of the MAC addresses of the short range transmitter, the BLE MAC address, or the token provided by device management system 102. The token may be encoded in the scan responses and client device 214 may decode the token.

In some embodiments, in response to receiving message 306 that includes the token, access point 112 may be instructed by device management system 102 to include the token in the short range wireless beacons sent by access points 112. Thus, client device 214 may not need to send scan request message 402 and may not listen to scan response message 404. Client device 214 may instead listen to short range wireless beacons of access point 112 that include the token. Thus, in some examples, client device 214 may extract the token from the short range wireless beacons. In some embodiments, one or more access points including access point 112 are present in a vicinity, e.g., a predefined distance, of client device 214. The one or more access points may transmit the short range wireless beacons that include the tokens. Thus, client device 214 may receive short range wireless beacons of one or more access points and client device 214 may extract one or more tokens of the one or more access points.

Figure 5:
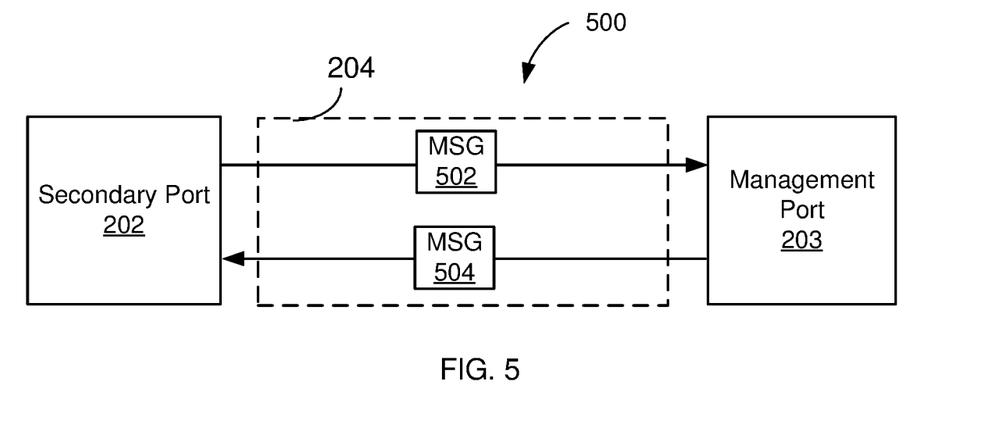
FIG. 5 illustrates a schematic diagram of an exemplary authorization system, according to some aspects of the disclosure.

FIG. 5 illustrates a schematic diagram of an exemplary authorization system 500, according to some aspects of the disclosure. Authorization system 500 is a portion of authorization system 200 that shows management port 203 and secondary port 202 of device management system 102, which are coupled through communication link 204 of device management system 102. In some examples, a processor, e.g., processor 216 of FIG. 2 is coupled between primary port 201, secondary port 202, and management port 203 and controls communication link 204. In some examples, one or more processors included in primary port 201, secondary port 202, and/or management port 203, control and synchronize communication link 204 of device management system 102. In some embodiments, management port 203 receives message 502, via communication link 204, from secondary port 202. Message 502 may include the identifying information of an access point, e.g., an un-provisioned access point 112, and may include a request for connection to cloud-managed network 100 and be associated with a customer account. Message 502 may be sent in response to secondary port 202 receiving message 302. The identifying information may include the token received from access point 112. As noted above, the communication via communication link 204 between management port 203 and secondary port 202 may be governed by processor 216 of device management system 102. Additionally, processor 216 of device management system 102, may authorize access point 112 to connect to cloud-managed network 100 based on the identifying information. Authorization may validate access point 112 for connection to cloud-managed network 100 and becoming associated with the customer account. In response to the authorization, management port 203 transmits message 504 (described below), via communication link 204, to secondary port 202. In some embodiments, management port 203 receives one or more messages 502, via communication link 204, from secondary port 202. The one or more messages 502 may include the identifying information of one or more access points that include one or more requests for connection to cloud-managed network 100. The identifying information of one or more access points may include the tokens associated with the one or more access points.

Figure 6:
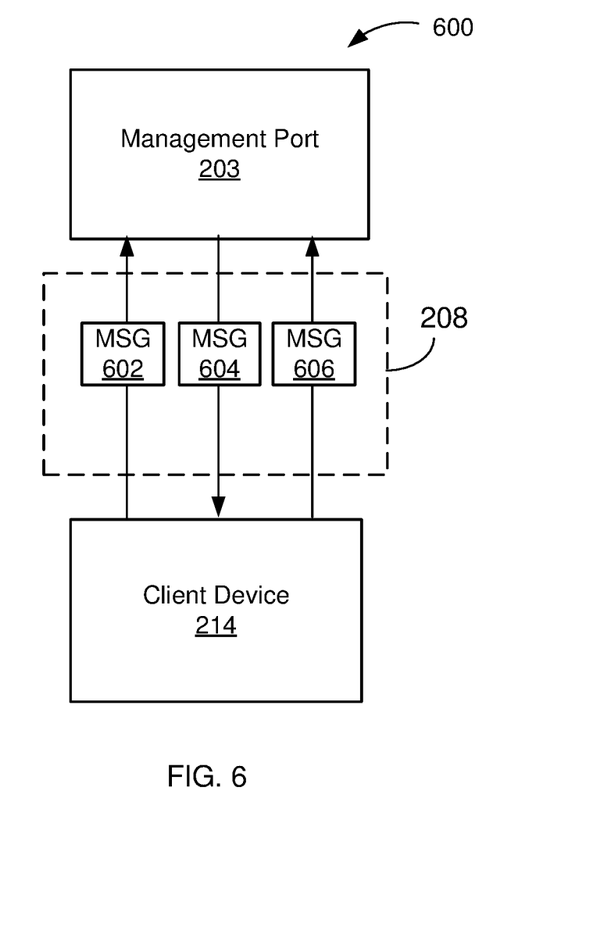
FIG. 6 illustrates a schematic diagram of an exemplary authorization system, according to some aspects of the disclosure.

FIG. 6 illustrates a schematic diagram of an exemplary authorization system 600, according to some aspects of the disclosure. Authorization system 600 is a portion of authorization system 200 that shows client device 214, which is coupled through communication link 208, to management port 203 of device management system 102. In some examples, communication link 208 is a wireless communication link. In some embodiments, a processor of client device 214 (not shown) and a processor of device management system 102, e.g., processor 216, control and synchronize communication link 208. In some examples, communication link 208 between client device 214 and management port 203, passes through a network controller such as network controller 110 shown in FIG. 1.

In some embodiments, client device 214 transmits a second transmission signal to management port 203. The second transmission signal may transmit message 602 to management port 203 of device management system 102. Client device 214 may transmit message 602 after receiving one or more tokens from the access points. Message 602 may be sent via communication link 208 and may include a list of the one or more tokens of the access points, including the token of access point 112. The access points are in the vicinity of client device 214 and may have responded to scan request message 402 and client device 214 has already received scan response message 404 that included the tokens. Alternatively, message 602 may include a list of one or more tokens of the access points, including access point 112, that are in the vicinity of client device 214. Message 602 may include identification information of the access points, such as the BLE MAC address of the access points, the short range transmitter MAC address of the access points, or the tokens provided by device management system 102 to the access points. In some examples, client device 214 may have extract the token from the scan response message 404. As discussed above, the token may be part of the short range wireless beacons transmitted by access points and thus client device 214 may not need to send scan request message 402 or listen to scan response message 404 and client device 214 may extract the token from the short range wireless beacons.

In response to receiving message 602, management port 203 may send message 604 to client device 214. In some embodiments, before sending message 604, management port 203 may compare the list of tokens received from client device 214 with the list of tokens received from the access points via secondary port 202. In some examples, there are one or more matches between the list received from client device 214 and the list received from secondary port 202. Thus, message 604 may be transmitted in response to finding at least a match and may include the identifying information, including the token, of the one or more matched access points.

In response to receiving message 604, client device 214 may transmit a second transmission signal to management port 203. The second transmission signal may include message 606 to management port 203. In some examples, client device 214 is the client device of an administrator of the customer account. In some embodiments, after receiving message 604 that includes the identifying information of the one or more matched access points, the administrator may review the identifying information and may authorize, e.g., approve, one or more matched access points. Thus, message 606 may include the identifying information of the authorized access points. Thus, message 606 may inform device management system 102 via management port 203 that the authorized access points may connect to cloud-managed network 100 and the customer account. In some examples, no access point is approved by the administrator to connect to the customer account. Thus, no message 606 may be sent or message 606 may be sent to inform device management system 102 via management port 203 that no un-provisioned access point is authorized and thus do not allow any un-provisioned access point to connect to the customer account. As discussed with regards to FIG. 5, when at least one access point is authorized to be connected to cloud-managed network 100, management port 203 may transmit message 504, via communication link 204, to secondary port 202. Message 504 may instruct secondary port 202 to send message 308 to access point 112 to try connecting to cloud-managed network 100, via communication link 218 and primary port 201.

Figure 7:
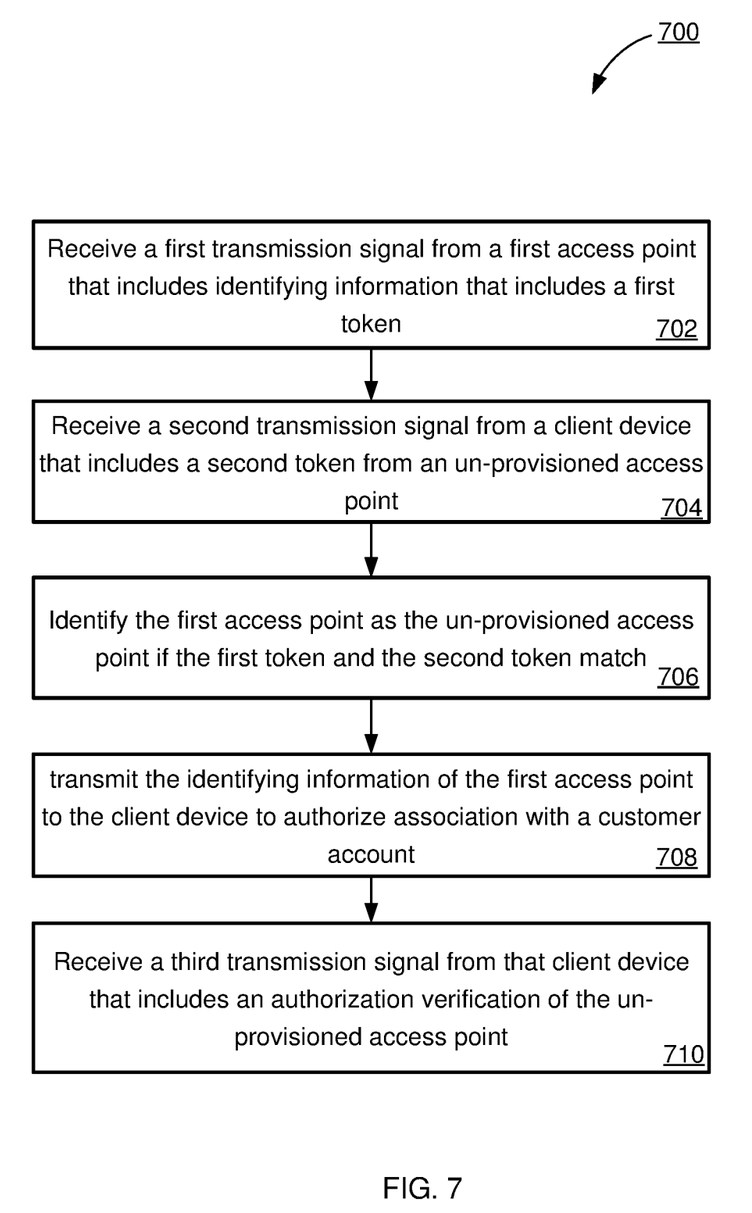
FIG. 7 illustrates a flow diagram of an exemplary process for authorizing an access point, according to some aspects of the disclosure.

FIG. 7 illustrates a flow diagram of an exemplary process for authorizing an access point using the example authorization system of FIG. 2, according to some aspects of the disclosure. In some examples, authorization system 200 may be used for implementing process 700. Notably, one or more steps of process 700 described herein may be omitted, performed in a different sequence, and/or combined with other processes for various types of applications contemplated herein. In some examples, a client of cloud-managed network 100 has an account on the cloud-managed network 100. As shown in FIG. 1, the client may have a number of access points 112A, 112B, to 112M that are already connected to cloud-managed network 100. As shown in FIG. 1, process 700 may use authorization system 200 for connecting an un-provisioned access point, e.g., access point 112, to user account on cloud-managed network 100 where the customer account may be stored on cloud network device 120.

Process 700 begins at step 702, where a first transmission signal is received from a first access point that includes the identifying information. The identifying information may include the first token. In some embodiments, when the first token is provided by device management system 102, the first token is not included in the identifying information and the first token may be retrieved from device management system 102 based on the identifying information. In some examples, the first access point is an access point that sends the first transmission through communication link 206 and secondary port 202 to device management system 102 of network devices 120. As shown in FIG. 2 the first transmission signal is received by device management system 102 through secondary port 202 and via communication link 206. In some examples, device management system 102 includes three ports. Primary port 201 is a default port for the access points to communication with cloud-managed network 100. When a client introduces a new access point, e.g., access point 112, to cloud-managed network 100, the new access point needs to be authorized before being allowed to connect to cloud-managed network 100 and to be associated with the customer account. If the new access point 112 tries to connect through primary port 201, the connection may be rejected and the new access point 112 may be directed to connect through secondary port 202. The new access point 112 may send the first transmission signal that includes the identifying information of access point 112 to secondary port 202 of device management system 102. Based on the identifying information of access point 112 that is received through secondary port 202, device management system 102 may identify that access point 112 is not connected to cloud-managed network 100 and thus may identify access point 112 as an un-provisioned access point that tries to connect to cloud-managed network 100 and connect to the customer account.

In some examples, access point 112 includes the BLE MAC address of access point 112 in the payload of BLE beacons. Access points may include their token in a payload of BLE beacons such that any device receiving the beacon can extract the unique token. In some examples, access point may not include BLE MAC address in the payload of the BLE beacons that are transmitted by access point 112. In some example, even if BLE MAC address is included in the payload of the BLE beacons, a device receiving the BLE beacon may not be able to extract the BLE MAC address. Thus, in some examples, BLE MAC address is not used as the identification information of access point 112 and device management system 102 may provide the unique token to access point 112. In some examples, when device management system 102 receives the first transmission signal from access point 112, device management system 102 identifies that a payload of the first transmission signal does not have a unique token or the unique token may not be extractable. Thus, device management system 102 generates and provides the unique token to access point 112. In some embodiments, no matter how the unique token it generated, the unique token is used for identifying access point 112. In some examples, the identifying information of each access points, in addition to the unique token includes a model, a serial number, and a base media access control (MAC) address of the access point.

In step 704, a second transmission signal is received from a client device. The second transmission signal includes a second token from an un-provisioned access point. As noted, a client introduces access point 112 to be connected to cloud-managed network 100. As shown in FIG. 2, client device 214 of a client, e.g., client device 214 of an administrator of the customer account may communicate with access point 112 and may receive the unique token from access point 112 via communication link 210 (e.g., a short range communication link, or a BLE communication link). In some examples, access point 112 may include the unique token in the payload of the beacon and thus client device 214 may extract the unique token from the payload of the beacon. In some examples, access point 112 may not include the unique token in the payload of the beacon or client device 214 may be capable of extracting the unique token even if the unique token is included in the payload of the beacon. Thus, client device 214 may send a scan request to access point. In some embodiments, client device 214 extracts the unique token either from the beacons of access point 112 or from scan responses received from access point 112. Then, client device 214 transmits the unique token using communication link 208 (e.g., a wireless communication link) and management port 203 to device management system 102. Thus, in some embodiments, device management system 102 receives the unique token of access point 112 from two different paths. First path, via communication link 206 and secondary port 202. Second path, via communication link 210, client device 214, communication link 208, and management port 203. In some embodiments, when the first token is provided by device management system 102, device management system 102 receives the unique token of access point 112 from the second path and also retrieves a stored token based on the identifying information as the unique token.

In step 706, in response to finding a match between the first token and the second token, identifying the first access point as the un-provisioned access point. In some examples as noted, the first access point that sends the first token (the unique token), is an access point that transmits the first transmission signal through communication link 206 and secondary port 202. The second access point that sends the second token (the unique token), is an access point that communicates with device management system 102 through communication link 210, client device 214, communication link 208, and management port 203. As described, in some embodiments, when the first token is provided by device management system 102, the first token is not included in the identifying information and the first token may be retrieved from device management system 102 based on the identifying information. In some examples, the first token and the second token match and device management system 102 identifies that the first access point is the un-provisioned access point and the unique token of the same access point has been sent through the first path and the second path.

In step 708, the identifying information of the first access point and a request to authorize the un-provisioned access point is transmitted to the client device. In some embodiments, since the first token and the second token matched, the un-provisioned access point is the first access point and thus the identifying information of the first access point received through secondary port 202 is the identifying information of the un-provisioned access point. Therefore, device management system 102 may transmit the identifying information of the first access point to client device 214 and client device 214 may receive the identifying information as the identifying information of the un-provisioned access point that has communicated through client device 214. Thus, a client such as an administrator of the customer account using client device 214, or an application program running on client device 214, may authorize the un-provisioned access point based on the identifying information received from device management system 102. In some examples, the administrator may use a serial number and/or a model of the un-provisioned access point that is included in the identifying information to authorize the un-provisioned access point. When the un-provisioned access point 112 is authorized, an authorization verification message may be sent by the client device 214 via communication link 208 and management port 203 to device management system 102. In some examples, based on the identifying information, the administrator may not authorize the un-provisioned access points. In some embodiments, the application program running on client device 214 is provided by device management system 102 or may be downloaded from an App store. In some examples, the administrator may use client device 214 with the provided application to login to the customer account and instruct client device's short range transmission subsystem (e.g., BLE subsystem) to scan and report detected short range transmission beacons (e.g., BLE beacons).

In some embodiments, device management system 102 receives a first group of one or more unique tokens through the first path and receives a second group of one or more unique tokens through the second path. In some embodiments, when the first token is provided by device management system 102, the first group of one or more unique tokens are not included in the identifying information and the first group of one or more unique tokens may be retrieved from device management system 102 based on the identifying information. Thus, device management system 102 may identify one or more matches between the first group of one or more unique tokens and the second group of one or more unique tokens. Then, device management system 102 may send one or more identifying information of the matched access points to client device 214 and the administrator may authorize more than one access point and send the more than one authorization verification to device management system 102. In some examples, device management system 102 may not identify a match or the administrator may not authorize an un-provisioned access point and thus no authorization verification is sent by client device to device management system 102.

In step 710, a third transmission signal is received from the client device. The third transmission signal includes an authorization verification of the un-provisioned access points. As noted above, after authorizing the un-provisioned access point 112, the client device 214 may send an authorization verification to device management system 102 and thus device management system 102 may receive the authorization verification of the un-provisioned access point 112 included in the third transmission signal. In some embodiments, the authorization verification authorizes the un-provisioned access point 112 to connect to cloud-managed network 100 and become associated with the customer account of cloud-managed network 100. In some examples, after receiving the authorization verification by device management system 102, cloud-managed network 100 may provide security credentials for the un-provisioned access point 112 to connect to cloud-managed network 100 and become associated with the customer account of cloud-managed network 100. In some embodiments, device management system 102 may transmit the security credentials via secondary port 202 to un-provisioned access point 112. Then access point 112 may use the security credentials to connect to cloud-managed network 100 and become associated with the customer account of cloud-managed network 100 via communication link 218 and primary port 201.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations, or processes disclosed is an illustration of exemplary approaches. Based upon design preferences, it is understood that the specific order or hierarchy of steps, operations, or processes may be rearranged. Some of the steps, operations, or processes may be performed simultaneously. Some or all of the steps, operations, or processes may be performed automatically, without the intervention of a user. The accompanying method claims, if any, present elements of the various steps, operations, or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "module for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

What is claimed is:

1. A method comprising:
   receiving a first transmission signal from a first access point, the first transmission signal comprises identifying information of the first access point that comprises a first token;
   receiving a second transmission signal from a client device, wherein the second transmission signal comprises a second token, the second token is received by the client device from an un-provisioned access point;
   in response to determining a match between the first token and the second token, identifying the first access point as the un-provisioned access point;
   transmitting the identifying information of the first access point and a request to the client device to authorize the un-provisioned access point; and
   receiving a third transmission signal from the client device, wherein the third transmission signal comprises an authorization verification of the un-provisioned access point that authorizes the un-provisioned access point to connect to a cloud-managed network and become associated with a customer account of the cloud-managed network,
   wherein the second transmission signal and the third transmission signal are received from the client device via a management port of a device management system of the cloud-managed network, and wherein the first transmission signal is received by a secondary port of the device management system of the cloud-managed network, the method further comprising:
   in response to receiving the third transmission signal from the client device, transmitting, via the secondary port, a first instruction to the un-provisioned access point to connect to the cloud-managed network via a primary port of the device management system, and
   in response to receiving the first transmission signal from the first access point, transmitting, via the secondary port, a second instruction to the first access point to reconnect to the secondary port after a predefined time interval.

2. The method of claim 1, further comprising:
   providing instructions to the un-provisioned access point to connect to the cloud-managed network.

3. The method of claim 1, further comprising:
   before receiving the first transmission signal from the first access point, receiving a primary transmission signal from the first access point, wherein the primary transmission signal does not include a token; and
   in response to receiving the primary transmission signal, providing a unique token to the first access point.

4. The method of claim 1, wherein the first instruction further comprises security credentials for the un-provisioned access point to connect to the cloud-managed network via the primary port of the device management system and become associated with the customer account, the method further comprises:
   connecting the un-provisioned access point, via the primary port, to the cloud-managed network; and
   creating an association between the un-provisioned access point and the customer account.

5. The method of claim 1, wherein the un-provisioned access point is configured to:
   transmit the first transmission signal via the secondary port to the device management system to request an association between the un-provisioned access point and the customer account;
   receive the second instruction via the secondary port from the device management system to reconnect to the secondary port after a predefined time interval;
   receive a scan request from the client device;
   transmit a scan response to the client device, wherein a payload of the scan response includes the second token;
   after the predefined time interval, transmit the first transmission signal via the secondary port to the device management system; and
   receive the first instruction via the secondary port from the device management system to connect to the cloud-managed network via the primary port of the device management system, wherein the primary port and the secondary port are a same port.

6. The method of claim 1, wherein a short range beacon of the un-provisioned access point is configured to indicate support for scan requests by the un-provisioned access point, and wherein the client device is configured to receive a short range wireless beacon of the un-provisioned access point.

7. The method of claim 6, wherein the short range wireless beacon is a Bluetooth low energy (BLE) beacon.

8. The method of claim 1, wherein the second transmission signal is received from the client device in response to:
   the client device transmits a scan request to the un-provisioned access point and, in response, the client device receives a scan response from the un-provisioned access point, wherein a payload of the scan response includes the second token.

9. The method of claim 1, wherein the identifying information includes a model, a serial number, a base media access control (MAC) address of the first access point, wherein the first token comprises a BLE MAC address of the first access point, and wherein the second token comprises a BLE MAC address of the un-provisioned access point.

10. A method comprising:
    receiving one or more first transmission signals from a first group of one or more first access points, wherein each one of the one or more first transmission signal includes identifying information of a respective first access point that comprises a respective first token;
    receiving a second transmission signal from a client device, wherein the second transmission signal comprises one or more second tokens received by the client device from a second group of one or more un-provisioned access points;
    in response to determining one or more matches between the respective first tokens of the first group of one or more first access points and the one or more second tokens, identifying respective first access points corresponding to the one or more matches as respective un-provisioned access points;

transmitting the identifying information of the respective first access points and a request to the client device to authorize the respective un-provisioned access points; and receiving a third transmission signal from the client device, wherein the third transmission signal comprises an authorization verification of at least one of the respective un-provisioned access points that authorizes the at least one of the respective un-provisioned access points to connect to a cloud-managed network and become associated with a customer account of the cloud-managed network, wherein the identifying information of the respective first access points includes a model and a serial number and/or a base media access control (MAC) address of the respective first access points, and wherein the respective first token comprises a respective first unique token provided by a device management system of the cloud-managed network to the respective first access points and the second token comprises a respective second unique token provided by the device management system to the respective un-provisioned access points.

11. The method of claim 10, further comprising:
providing instructions to the at least one of the respective un-provisioned access points to connect to the cloud-managed network.

12. The method of claim 10, wherein the one or more first transmission signals are received via a secondary port of the device management system of a cloud-managed network, the method further comprising:
before receiving the one or more first transmission signals from the first group of one or more first access points, receiving, via the secondary port, one or more primary transmission signals from the first group of one or more first access points, wherein the one or more primary transmission signals do not include a token; and
in response to receiving the one or more primary transmission signals, providing one or more unique tokens to the first group of one or more first access points via the secondary port.

13. The method of claim 12, wherein the second transmission signal and the third transmission signal are received from the client device via a management port of the device management system of the cloud-managed network, the method further comprising:
in response to receiving the third transmission signal from the client device, transmitting, via the secondary port, one or more first instructions to the second group of one or more un-provisioned access points to connect to the cloud-managed network via a primary port of the device management system.

14. The method of claim 13, wherein each one of the one or more first instructions further comprises security credentials for one of the respective un-provisioned access points to connect to the cloud-managed network via the primary port of the device management system and become associated with the customer account, the method further comprises:
connecting the respective un-provisioned access point, via the primary port, to the cloud-managed network; and
creating an association between the respective un-provisioned access point and the customer account.

15. The method of claim 13, wherein each one of the un-provisioned access points is configured to:
transmit the first transmission signal via the secondary port to the device management system to request an association between the un-provisioned access point and the customer account;
receive a second instruction via the secondary port from the device management system to reconnect to the secondary port after a predefined time interval;
receive a scan request from the client device;
transmit a scan response to the client device, wherein a payload of the scan response includes the second token;
after the predefined time interval, transmit the first transmission signal via the secondary port to the device management system; and
receive the first instruction via the secondary port from the device management system to connect to the cloud-managed network via the primary port of the device management system.

16. The method of claim 10, wherein the second transmission signal is received from the client device in response to:
the client device transmits a scan request to the second group of one or more un-provisioned access points and, in response, the client device receives a scan response from the second group of one or more un-provisioned access point, wherein a payload of each one of the scan response includes the second token of each one of the second group of one or more un-provisioned access point.

17. A method comprising:
receiving a first transmission signal from a first access point, the first transmission signal comprises identifying information of the first access point that comprises a first token;
receiving a second transmission signal from a client device, wherein the second transmission signal comprises a second token, the second token is received by the client device from an un-provisioned access point;
in response to determining a match between the first token and the second token, identifying the first access point as the un-provisioned access point;
transmitting the identifying information of the first access point and a request to the client device to authorize the un-provisioned access point; and
receiving a third transmission signal from the client device, wherein the third transmission signal comprises an authorization verification of the un-provisioned access point that authorizes the un-provisioned access point to connect to a cloud-managed network and become associated with a customer account of the cloud-managed network,
wherein the identifying information includes a model and a serial number and/or a base media access control (MAC) address of the first access point, and wherein the first token comprises a first unique token provided by a device management system of the cloud-managed network to the first access point and the second token comprises a second unique token provided by the device management system to the un-provisioned access point.

* * * * *